United States Patent
Jung et al.

(10) Patent No.: US 10,624,092 B2
(45) Date of Patent: Apr. 14, 2020

(54) D2D OPERATION METHOD PERFORMED BY TERMINAL IN WIRELESS COMMUNICATION SYSTEM, AND TERMINAL USING THE METHOD

(71) Applicant: LG ELECTRONICS INC., Seoul (KR)

(72) Inventors: Sunghoon Jung, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/769,776

(22) PCT Filed: Oct. 21, 2016

(86) PCT No.: PCT/KR2016/011920
§ 371 (c)(1),
(2) Date: Apr. 20, 2018

(87) PCT Pub. No.: WO2017/069576
PCT Pub. Date: Apr. 27, 2017

(65) Prior Publication Data
US 2018/0332584 A1   Nov. 15, 2018

Related U.S. Application Data

(60) Provisional application No. 62/244,208, filed on Oct. 21, 2015.

(51) Int. Cl.
*H04W 72/04* (2009.01)
*H04W 48/16* (2009.01)
(Continued)

(52) U.S. Cl.
CPC ....... *H04W 72/0453* (2013.01); *H04W 8/005* (2013.01); *H04W 48/08* (2013.01); *H04W 48/16* (2013.01)

(58) Field of Classification Search
CPC ................................................. H04W 72/0453
See application file for complete search history.

(56) References Cited

U.S. PATENT DOCUMENTS

2014/0269558 A1   9/2014   Sartori et al.
2014/0321438 A1   10/2014  Park et al.
(Continued)

FOREIGN PATENT DOCUMENTS

WO   2013-109100   7/2013
WO   2015-095583   6/2015
WO   2015-115847   8/2015

OTHER PUBLICATIONS

3GPP TS 36.304 V8.5.0.

*Primary Examiner* — John D Blanton
(74) *Attorney, Agent, or Firm* — Dentons US LLP

(57) ABSTRACT

The present invention provides a device-to-device (D2D) operation method performed by a terminal in a wireless communication system, said method involving receiving a first system information block that contains an inter-frequency D2D setting, receiving information that indicates the effective time of the inter-frequency D2D setting, and performing inter-frequency D2D on the basis of the inter-frequency D2D setting and the information that indicates the effective time.

9 Claims, 19 Drawing Sheets

(51) Int. Cl.
*H04W 8/00* (2009.01)
*H04W 48/08* (2009.01)

(56) References Cited

U.S. PATENT DOCUMENTS

| | | | |
|---|---|---|---|
| 2014/0342747 A1* | 11/2014 | Lee | H04L 5/0053 |
| | | | 455/450 |
| 2016/0205534 A1* | 7/2016 | Fujishiro | H04W 72/048 |
| | | | 455/434 |
| 2016/0366677 A1* | 12/2016 | Fujishiro | H04W 76/14 |
| 2017/0325277 A1* | 11/2017 | Fujishiro | H04W 4/06 |
| 2018/0332584 A1* | 11/2018 | Jung | H04W 48/08 |

* cited by examiner

D2D OPERATION METHOD PERFORMED BY TERMINAL IN WIRELESS COMMUNICATION SYSTEM, AND TERMINAL USING THE METHOD

CROSS-REFERENCE TO RELATED APPLICATIONS

This application is the National Stage filing under 35 U.S.C. 371 of International Application No. PCT/KR2016/011920, filed on Oct. 21, 2016, which claims the benefit of U.S. Provisional Application No. 62/244,208 filed on Oct. 21, 2015, the contents of which are all hereby incorporated by reference herein in their entirety.

BACKGROUND OF THE INVENTION

Field of the Invention

The present invention relates to wireless communication and, most particularly, to a D2D operation method performed by a terminal in a wireless communication system and a terminal using the method.

Related Art

The International Telecommunication Union Radio communication sector (ITU-R) is carrying out a standardization process of International Mobile Telecommunication (IMT)-Advanced, which is a next generation mobile communication system developed after the $3^{rd}$ generation mobile communication system. The IMT-Advanced seeks to achieve the goal of providing Internet Protocol (IP)-based multimedia service support at a data transmission rate of 1 Gbps in an immobile state and a low-speed mobile state, and 100 Mbps in a high-speed mobile state.

As a system standard satisfying the requirements of the IMT-Advanced, the 3rd Generation Partnership Project (3GPP) is preparing for LTE-Advanced (LTE-A), which corresponds to an enhanced version of the Long Term Evolution (LTE) that is based on the Orthogonal Frequency Division Multiple Access (OFDMA)/Single Carrier-Frequency Division Multiple Access (SC-FDMA) transmission schemes. The LTE-A is one of the most promising candidates for the IMT-Advanced.

Interest has recently been growing in the Device-to-Device (D2D) technology, wherein direct communication is carried out between devices. Most particularly, D2D is drawing attention as the communication technology that is suitable for public safety network. Although the commercial communication network is quickly shifting to LTE, due to the problem of collision with the legacy communication standard and the issue of cost, the current public safety network is still mostly based on the 2G technology. Such gap between the communication technologies and demand for more enhanced services are now leading to efforts in seeking to enhance the public safety network.

In comparison with the commercial communication network, the public safety network has a higher service requirement condition (reliability and security), and, most particularly, even when the coverage of cellular communication is out of reach or is unavailable, the public safety network still requires direct transmission and reception of signals between devices, i.e., D2D operation.

The D2D operation may have diverse advantages in the aspect of performing signal transmission/reception between close-ranged devices. For example, a D2D device (or D2D UE) may perform data communication at a high transmission rate with low latency. Also, the D2D operation may disperse (or distribute) the traffic being concentrated to the base station, and, if the D2D UE performs the functions of a relay station, the D2D UE may also perform the function of expanding the coverage of the base station.

According to the current system information block acquisition procedure, even a minor update of any system information block must be notified to the terminals (or user equipments (UEs)) via paging. Accordingly, when performing the current system information block acquisition procedure, since any (minor) change in the inter-frequency D2D setting may cause frequent updates in the system information, this may cause a significant influence on the entire system. Such influence may not be advantageous or preferable for the entire system.

Moreover, the inter-frequency D2D setting may correspond to setting (or configuration) information having a low necessity level (or preference level) for the UE (or terminal). The system information block that is related to the current inter-frequency D2D setting may correspond to SIB 19. Even though the SIB 19 corresponds to a system information clock including setting information having a low necessity level for the UE, since frequent update has occurred, the UE was required to unnecessarily receiving paging messages in order to update the system information block, which even includes information in which the UE is not interested. Accordingly, the present invention intends to provide a method and a device (or terminal) that can resolve the above-described problems.

Furthermore, in case cell crossing a frequency (e.g., Cell A over Frequency 1 and Cell B over Frequency 2) associate (or cooperate) with one another for the D2D operation (i.e., in case of performing the inter-frequency D2D operation), modification periods (MPs) of the cells within different frequencies may be different from one another. Moreover, even if the modification periods (MPs) of the cell within different frequencies are the same, boundaries of the modification periods (MPs) of the different cells that cross the frequencies may occur at different timings. In this case, there occurred a case where the update of the D2D setting is synchronized to the UES of other cells using the D2D setting and, therefore, the update is not notified to the UEs. (More specifically, when a UE performs discovery within another cell, a problem occurred in that invalid D2D setting was used.) Accordingly, the present invention intends to provide a method and device that can resolve the problem of the UE performing D2D based on an invalid inter-frequency D2D setting.

SUMMARY OF THE INVENTION

Technical Objects

A technical object that is to be achieved by the present invention is to provide a D2D operation method performed by a terminal in a wireless communication system, and a terminal using the method.

Technical Solutions

In an aspect, a method of performing device-to-device (D2D) operation by a user equipment (UE) in a wireless communication system is provided. The method may comprise receiving a first system information block including inter-frequency D2D configuration, receiving information indicating validity duration of the inter-frequency D2D configuration and performing inter-frequency D2D based on the inter-frequency D2D configuration and the information indicating validity duration.

The first system information block may be differentiated from a second system information block including inter-frequency D2D configuration.

The first system information block may be valid until a time point being indicated by the information indicating validity duration.

The first system information block may be received through a first cell within a first frequency. The second system information block may be received through a second cell within a second frequency. And the inter-frequency D2D may be performed in the second cell within the second frequency.

The information indicating the validity duration may correspond to information indicating a time point at which the second system information block is updated, the second system information block being received through the second cell.

The time point at which the second system information block is updated may correspond to a boundary of a system information modification period of the second cell.

The inter-frequency D2D may be performed based on the inter-frequency D2D configuration until a time point indicated by the information indicating the validity duration, and the inter-frequency D2D may not use the inter-frequency D2D configuration after a time point indicated by the information indicating the validity duration.

The information indicating the validity duration may be received before a time point at which the second system information block is updated.

The first system information block may correspond to system information block 20 (SIB 20), and the second system information block may correspond to system information block 19 (SIB 19).

The first system information block may be acquired at each acquisition period of the first system information block.

The acquisition period of the first system information block may correspond to a scheduling period of the first system information block.

The acquisition period of the first system information block may correspond to a period corresponding to N times of a scheduling period of the first system information block.

In another aspect, a user equipment is provided. The UE may comprise a radio frequency (RF) unit transmitting and receiving radio signals and a processor being operatively connected to the RF unit. The processor may be configured to receive a first system information block including inter-frequency D2D configuration, to receive information indicating validity duration of the inter-frequency D2D configuration, and to perform inter-frequency D2D based on the inter-frequency D2D configuration and the information indicating validity duration.

Effects of the Invention

According to the present invention, provided herein is a D2D operation method performed by a terminal in a wireless communication system, and a terminal using the method.

According to the present invention, an inter-frequency D2D setting may be provided to a terminal (or user equipment (UE)) by a cell. Furthermore, by preventing UEs not being interested in inter-frequency D2D discovery from performing system information update procedures, application of unnecessary (or invalid) D2D settings to the UE may be prevented.

According to the present invention, a UE may perform inter-frequency D2D by using only the valid inter-frequency D2D setting. Therefore, in the method according to the present invention, the process of performing D2D using invalid inter-frequency D2D setting may be prevented.

DESCRIPTION OF EXEMPLARY EMBODIMENTS

Figure 1:
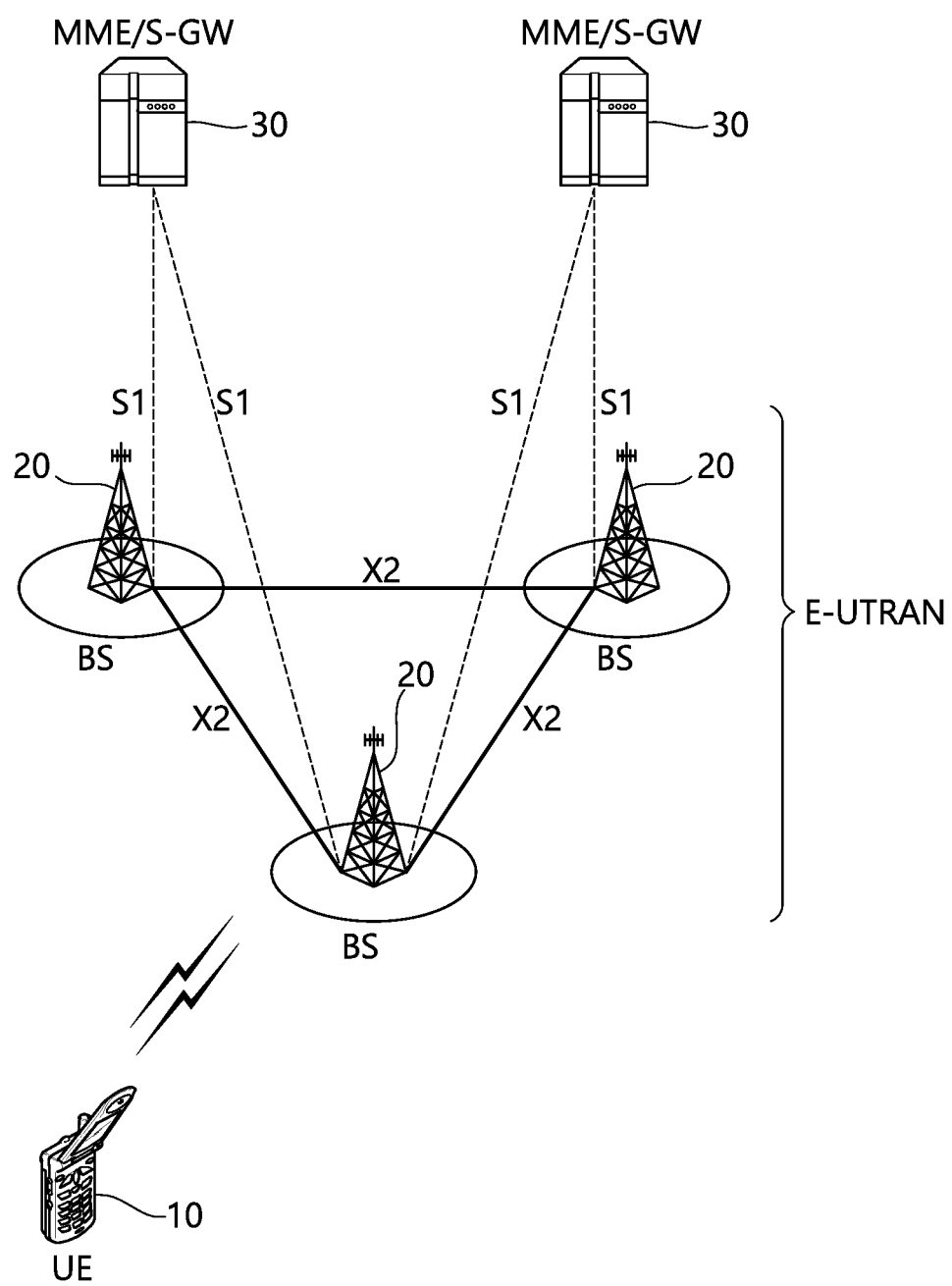
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
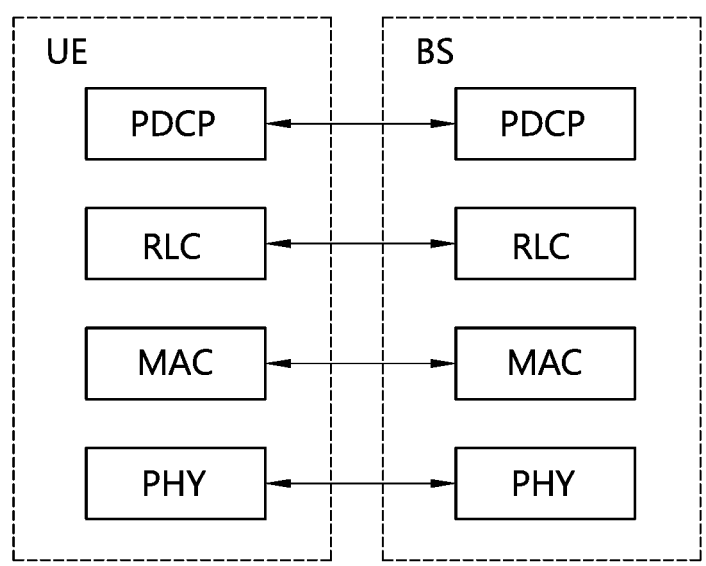
FIG. 2 is a diagram showing a wireless protocol architecture for a user plane.
Figure 3:
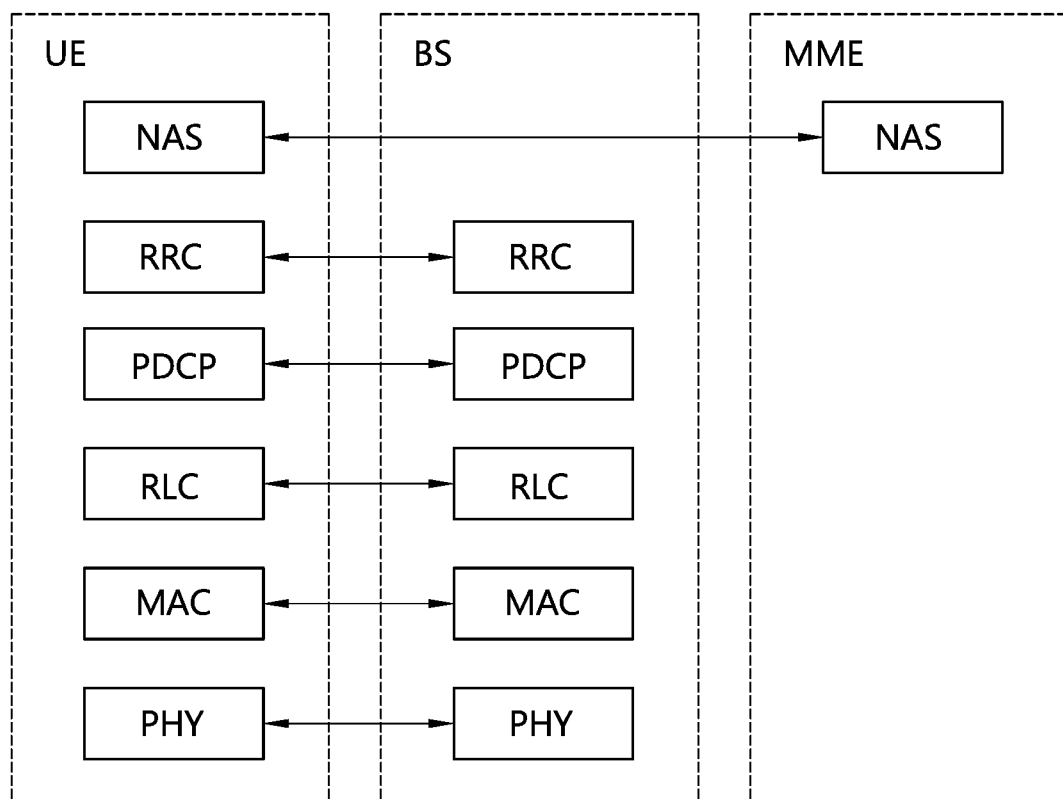
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
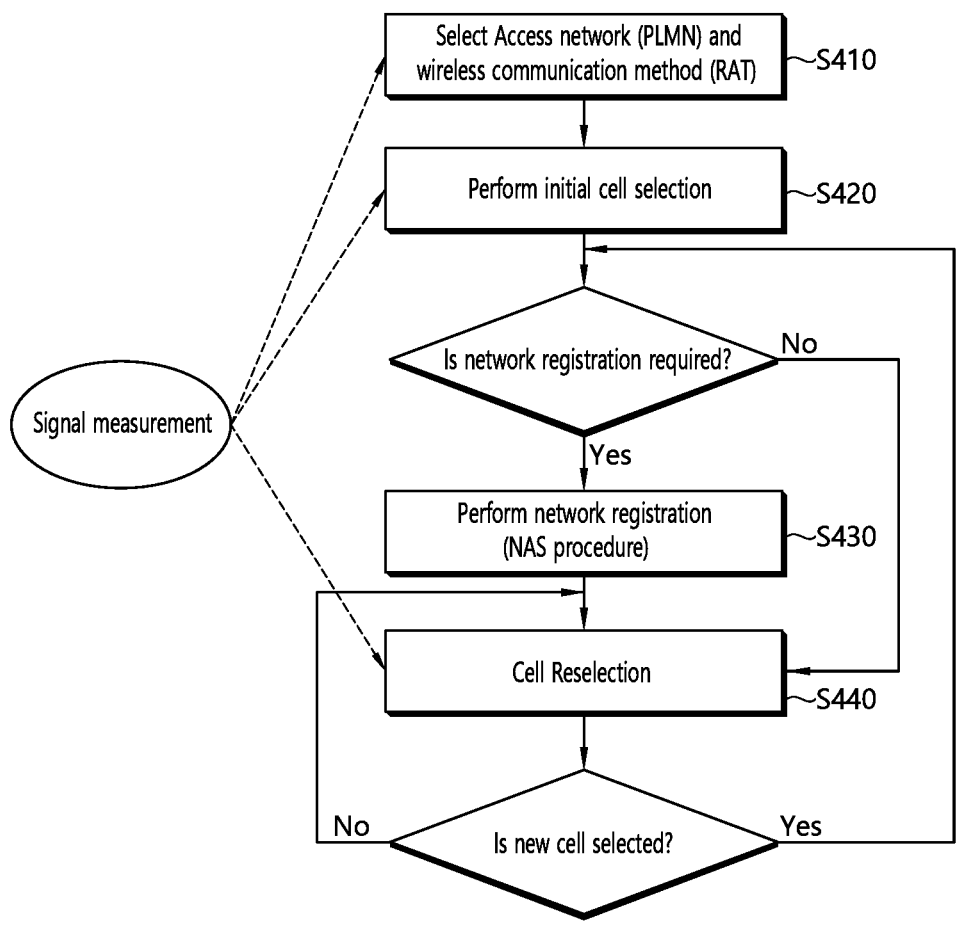
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
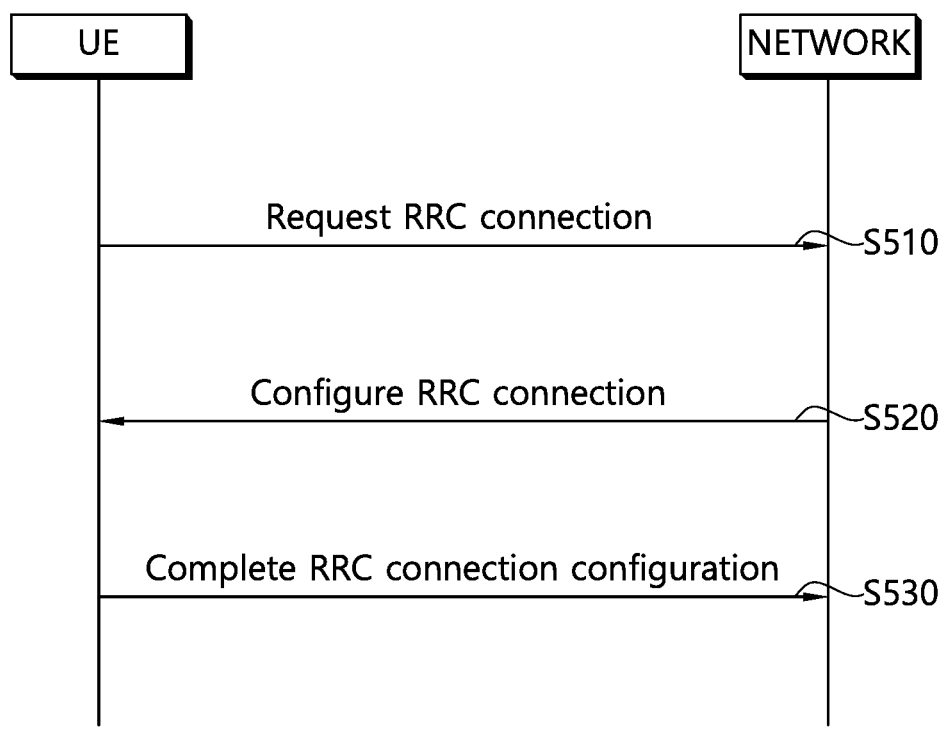
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
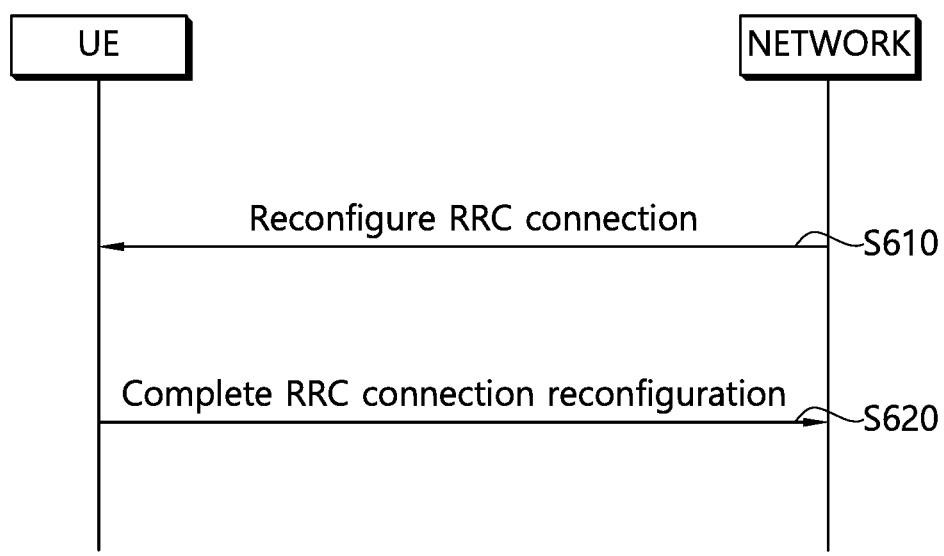
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

Srxlev>0 AND Squal>0, [Equation 1]

where:

$Srxlev = Q_{rxlevmeas} - (Q_{rxlevmin} + Q_{rxlevminoffset}) - P_{compensation}$ $Squal = Q_{qualmeas} - (Q_{qualmin} + Q_{qualminoffset})$ In this case, in Equation 1, the variables may be defined as in Table 1 below.

TABLE 11

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency. For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection. For the intra-frequency or inter-frequency cell reselection, a network may provide UE with a cell reselection black list used in cell reselection.

The UE does not perform cell reselection on a cell included in the black list.

Ranking performed in a cell reselection evaluation procedure is described below.

A ranking criterion used to give the priority of a cell is defined as in Equation 2.

$$R_s = Q_{meas,s} + Q_{hyst}, R_n = Q_{meas,n} - Q_{offset} \quad \text{[Equation 2]}$$

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
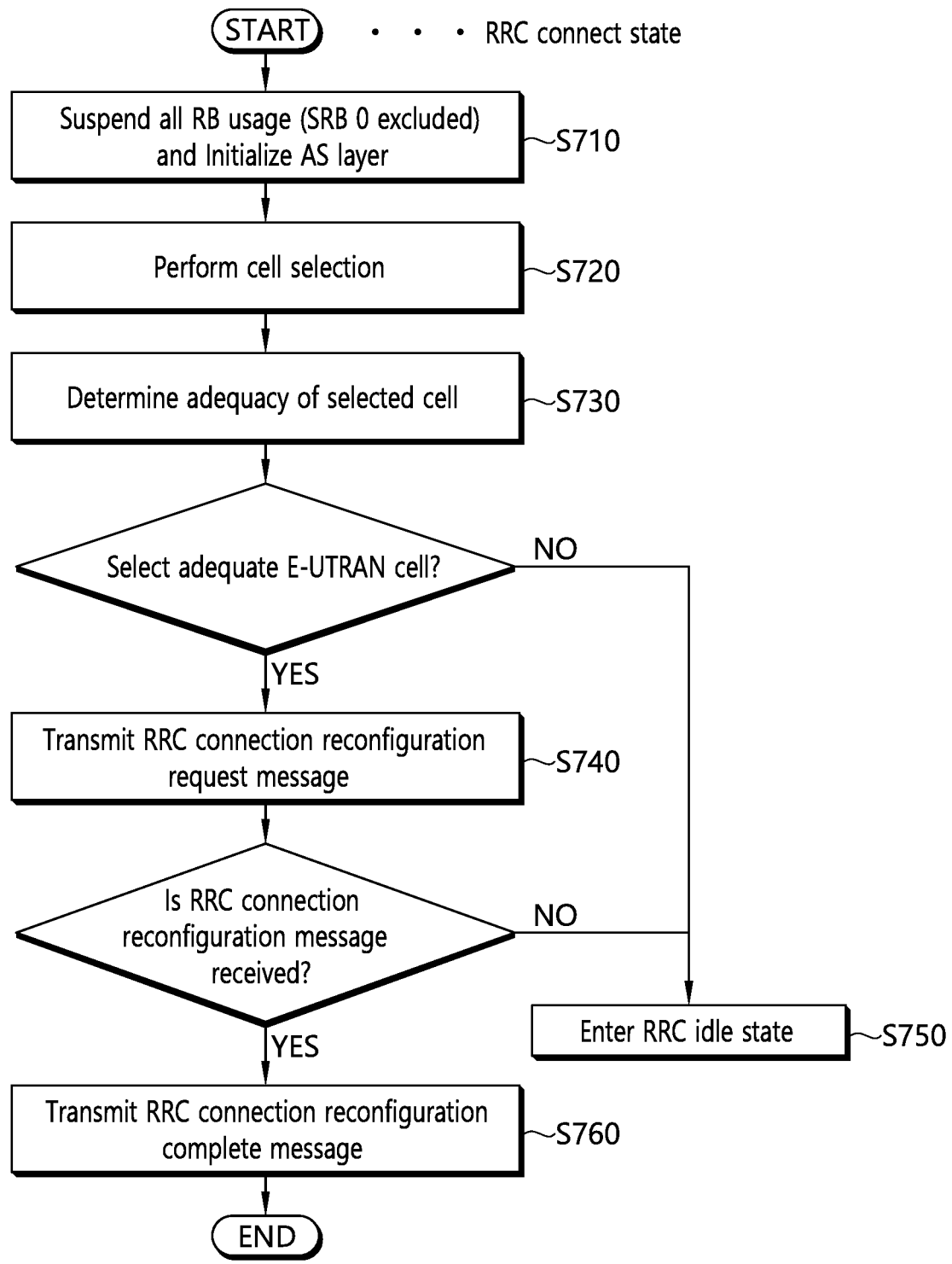
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
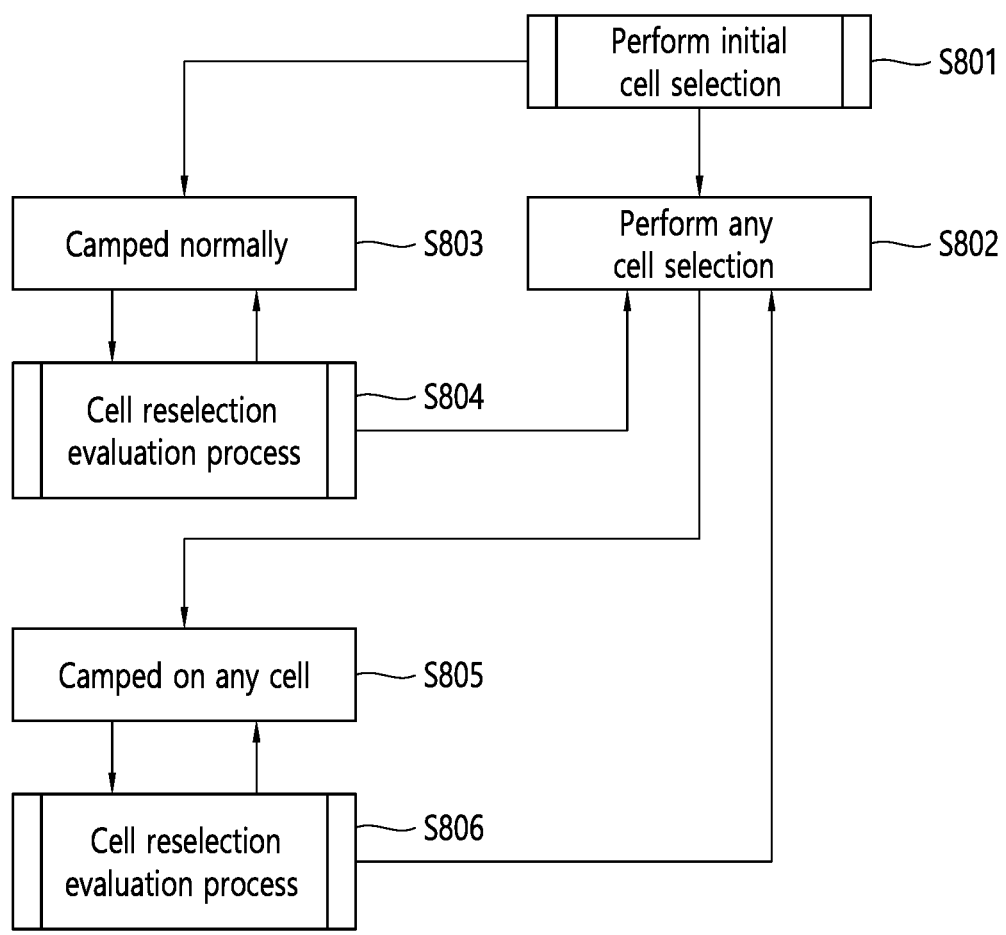
FIG. 8 illustrates sub states where the terminal may have in an RRC_IDLE state and a sub state transition process.

FIG. 8 illustrates sub states where the terminal may have in an RRC_IDLE state and a sub state transition process.

Referring to FIG. 8, a terminal performs an initial cell selection process (S801). The initial cell selection process may be performed when there is no stored cell information with respect to the PLMN or a suitable cell is not found.

If the suitable cell is not found in the initial cell selection process, the terminal transitions to an any cell selection state (S802). The optional cell selection state represents a state which does not camp on in both of a suitable cell and an acceptable cell. The optional cell selection state is a state attempted by the terminal in order to find an acceptable cell of an optional PLMN which may camp on. When the terminal finds no cells which may camp on, the terminal is continuously maintained in an optional cell selection state until the acceptable cell is found.

If the suitable cell is found in the initial cell selection process, the state transits to a normal camp state (S803). The normal camp state represents a state which camps on the normal cell. A paging channel is selected according to information given through system information to motor, and an evaluation process for cell reselection may be performed.

In the normal camp state (S803), if a cell reselection evaluation process (S804) is caused, the cell reselection evaluation process (S804) is performed. If a suitable cell is found in the cell reselection evaluation process (S804), the terminal again transits to the normal camp state (S803).

If an acceptable cell is found in the any cell selection state (S802), the terminal transits to an any cell camped state (S805). The any cell camped state (S805) represents a state of camping on an acceptable cell.

In the any cell camped state (S805), the terminal may select a paging channel according to information given through system information to monitor, and may perform a cell reselection evaluation process (S806). If the acceptable cell is not found in the cell reselection evaluation process (S806), the terminal transits the any cell selection state (S802).

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 9:
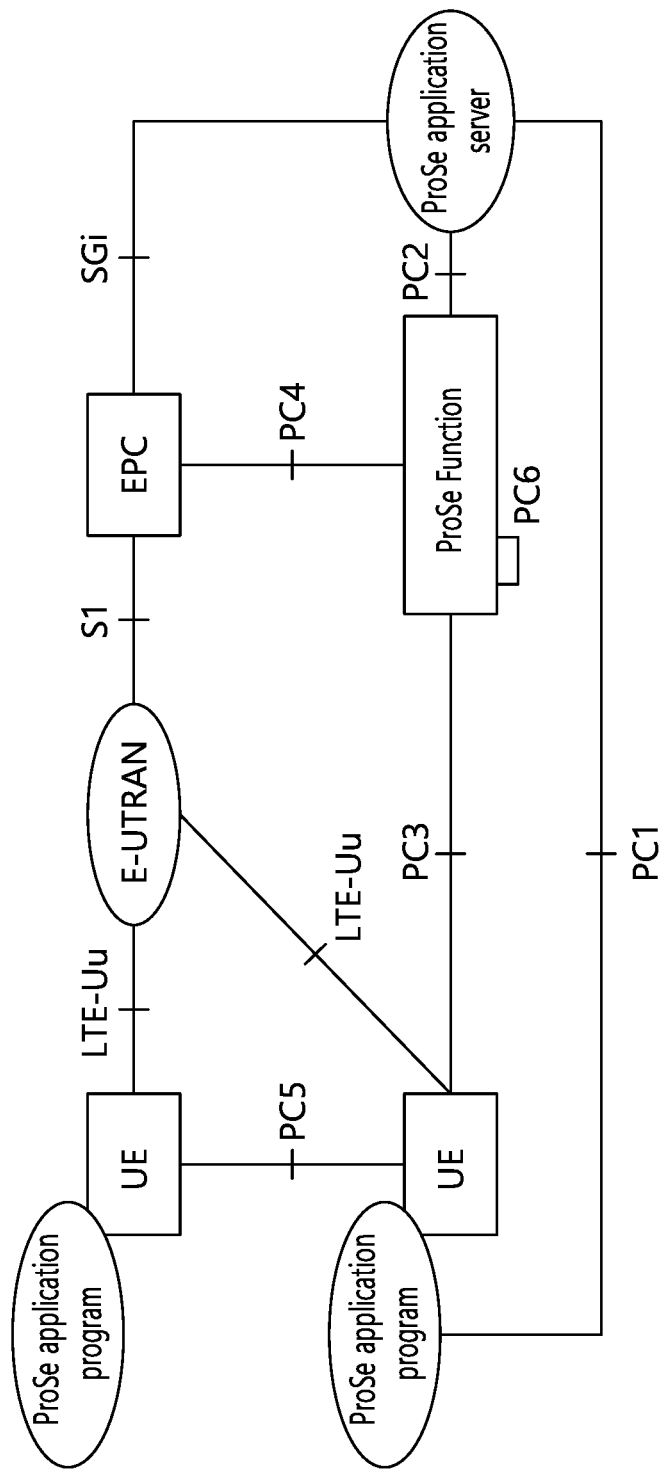
FIG. 9 illustrates a reference structure for a ProSe.

FIG. 9 illustrates a reference structure for a ProSe.

Referring to FIG. 9, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.
  Interworking via a reference point towards the 3rd party applications
  Authorization and configuration of the UE for discovery and direct communication)
  Enable the function of the EPC level ProSe discovery
  ProSe related new subscriber data and handling of data storage, and also handling of ProSe identities
  Security related function
  Provide control towards the EPC for policy related function
  Provide function for charging (via or outside of EPC, e.g., offline charging))

Hereinafter, a reference point and a reference interface will be described in a reference structure for the ProSe.
  PC1: a reference point between a ProSe application program in the terminal and a ProSe application program in a ProSe application server. The PC1 is used to define signaling requirements in an application level.
  PC2: is a reference point between the ProSe application server and a ProSe function. The PC2 is used to define an interaction between the ProSe application server and a ProSe function. An application data update of a ProSe database of the ProSe function may be an example of the interaction.
  PC3: is a reference point between the terminal and the ProSe function. The PC3 is used to define an interaction between the terminal and the ProSe function. Configuration for ProSe discovery and communication may be an example of the interaction.
  PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.
  PC5: is a reference point to use control/user plane for discovery, communication, and relay between terminals, and 1:1 communication.
  PC6: is a reference point to use a function such as ProSe discovery between users included in different PLMNs.
  SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 10:
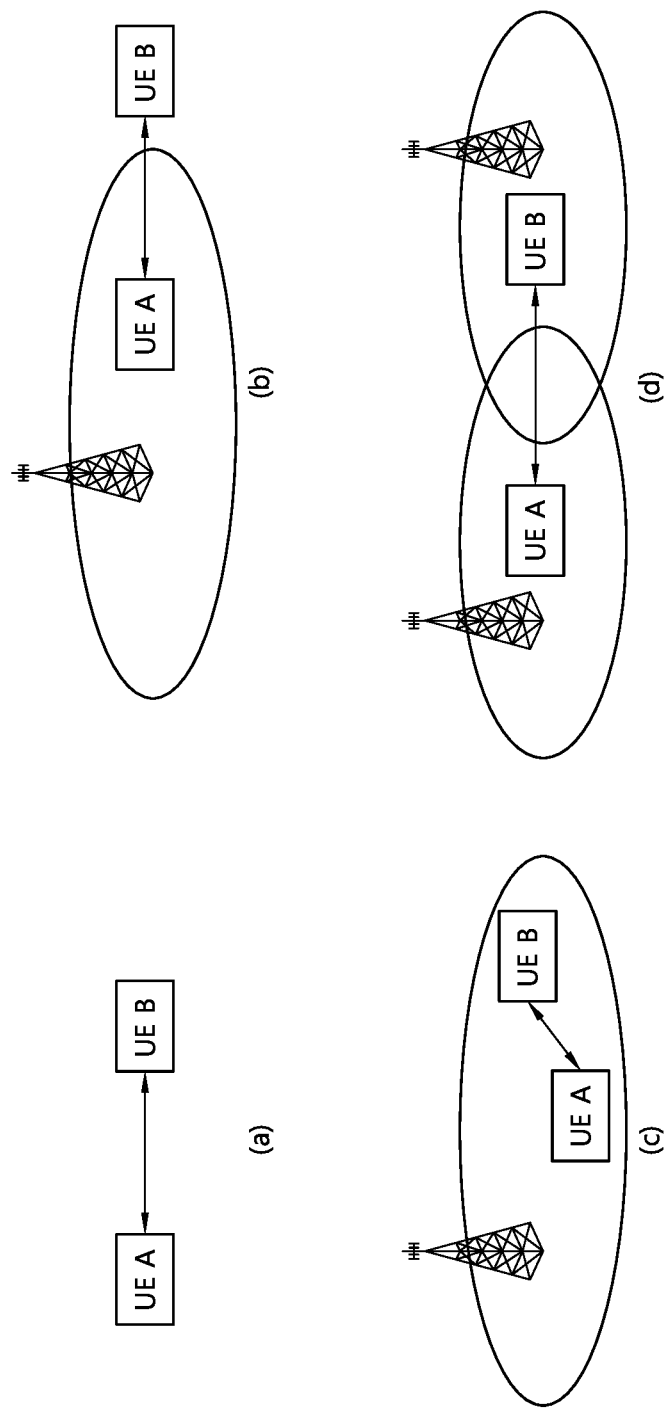
FIG. 10 illustrates arrangement examples of terminals performing ProSe direct communication and cell coverage.

FIG. 10 illustrates arrangement examples of terminals performing ProSe direct communication and cell coverage.

Referring to FIG. 10(a), UEs A and B may be located outside of the cell coverage. Referring to FIG. 10(b), the UE A may be located in the cell coverage and the UE B may be located outside of the cell coverage. Referring to FIG. 10(c), both of UEs A and B may be located in the cell coverage. Referring to FIG. 10(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 11:
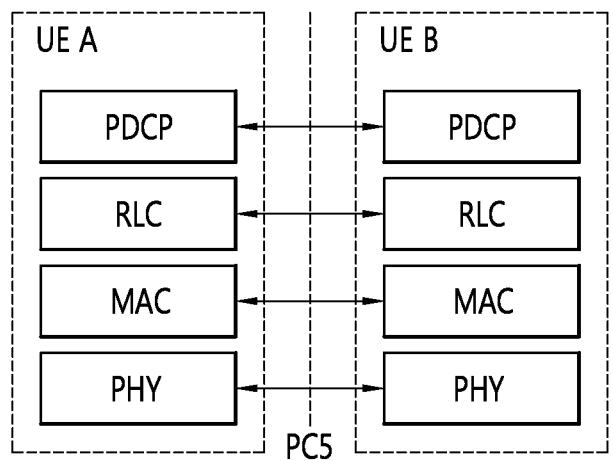
FIG. 11 illustrates a user plane protocol stack for the ProSe direct communication.

FIG. 11 illustrates a user plane protocol stack for the ProSe direct communication.

Referring to FIG. 11, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 12:
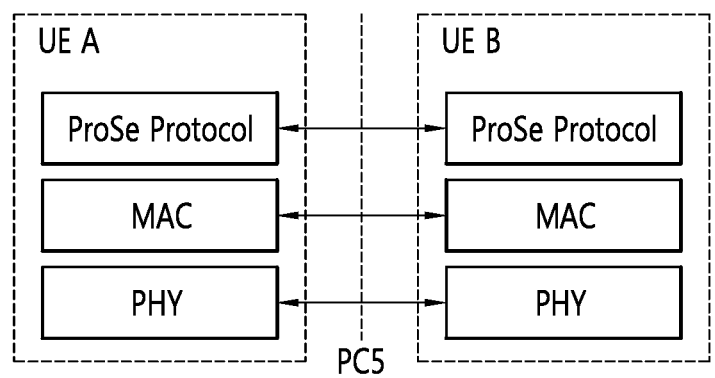
FIG. 12 illustrates a PC 5 interface for D2D discovery.

FIG. 12 illustrates a PC 5 interface for D2D discovery.

Referring to FIG. 12, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

Hereinafter, the present invention will be described in detail.

According to the current technology, in case a new (i.e., updated) system information block, which is different from the conventional (or existing) system information block (SIB), is required to be broadcasted, before the cell actually initiates (or starts) the broadcasting of the new system information block, with the exception System Information Block 1 (SIB 1), all of the system information blocks (SIBs) (corresponding to the cell) need to be notified to the terminal (or UE). For example, in case the cell wishes to broadcast a new system information block 19 (SIB 19) instead of broadcasting the existing system information block 19 (SIB 19), the cell broadcasts the new SIB 19 via paging, and, accordingly, the UE acquires the new SIB 19 via paging.

The inter-frequency D2D setting includes D2D setting for one or more inter-frequencies. Accordingly, the system information block including the inter-frequency D2D setting is more likely to update the system information more frequently than other system information blocks. More specifically, since the inter-frequency D2D setting includes D2D setting for a plurality of inter-frequencies, even if any one of the D2D settings for any one of the plurality of inter-frequencies is changed, the system information block including the inter-frequency D2D setting is required to be updated. Thus, the system information block including the inter-frequency D2D setting has a higher likelihood of being more frequently updated than the other system information blocks.

According to the current system information block acquisition procedure, in case the UE acquires system information, the system information block is considered to be valid during the entire modification period. Additionally, any minor update in any of the system information blocks must be notified to the UEs. (More specifically, any system information update must be notified via paging during a modification period preceding the next modification period, which corresponds to a period during which the new system information is broadcasted.) Accordingly, when performing the current system information block acquisition procedure, since any (minor) change in the inter-frequency D2D setting may cause frequent updates in the system information, this may cause a significant influence on the entire system. Such influence may not be advantageous or preferable for the entire system.

As described above, the notification of the update in the system information block(s) is also applied to a case where the system information block including the inter-frequency D2D setting is updated. In this case, the inter-frequency D2D setting may correspond to setting (or configuration) information having a low necessity level (or preference level) for the UE (or terminal) (since the UE is not necessarily always interested in performing inter-frequency D2D). The system information block that is related to the current inter-frequency D2D setting may correspond to SIB 19. Even though the SIB 19 corresponds to a system information clock including setting information having a low necessity level for the UE, since frequent update has occurred, the UE was required to unnecessarily receiving paging messages in order to update the system information block, which even includes information in which the UE is not interested. Accordingly, the present invention intends to provide a method and a device (or terminal) that can resolve the above-described problems.

Furthermore, in case cell crossing a frequency (e.g., Cell A over Frequency 1 and Cell B over Frequency 2) associate (or cooperate) with one another for the D2D operation (i.e., in case of performing the inter-frequency D2D operation), modification periods (MPs) of the cells within different frequencies may be different from one another. Moreover, even if the modification periods (MPs) of the cell within different frequencies are the same, boundaries of the modification periods (MPs) of the different cells that cross the frequencies may occur at different timings. In this case, there occurred a case where the update of the D2D setting is synchronized to the UES of other cells using the D2D setting and, therefore, the update is not notified to the UEs. (More specifically, when a UE performs discovery within another cell, a problem occurred in that invalid D2D setting was used.) Accordingly, the present invention intends to provide a method and device that can resolve the problem of the UE performing D2D based on an invalid inter-frequency D2D setting.

Hereinafter, in the current system information block acquisition procedure, in order to resolve the problem of frequent updates occurring in the system information due to any (minor) change in the inter-frequency D2D setting, 1. a method and device for providing a new system information block related to the inter-frequency D2D setting will be described in detail. Furthermore, when a UE performs discovery (i.e., inter-frequency D2D) in another cell (within another frequency), in order to resolve the problem of using an invalid D2D setting, 2. a method and device for providing information indicating a validity duration (or valid time) of the inter-frequency D2D setting will be described in detail.

1. A method for providing a new system information block related to the inter-frequency D2D setting FIG. 13 is a flow chart of a method providing a new system information block related to an inter-frequency D2D setting.

Figure 13:
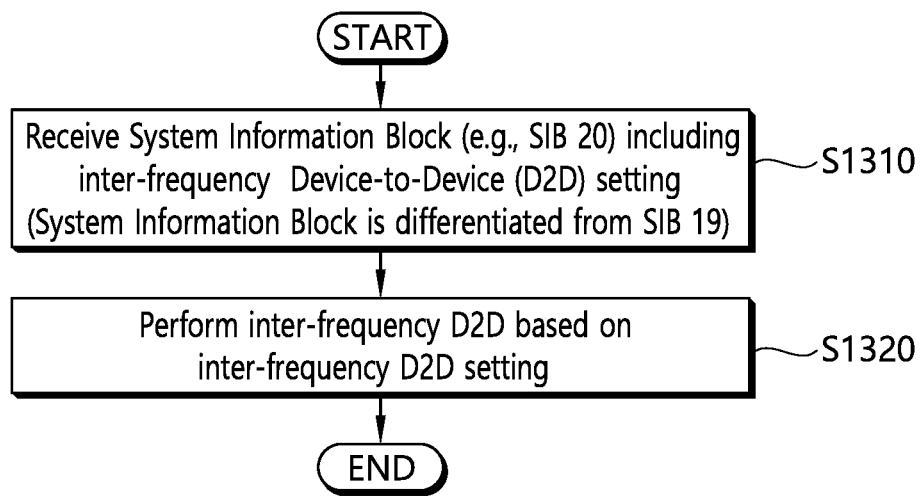
FIG. 13 is a flow chart of a method providing a new system information block related to an inter-frequency D2D setting.

According to the FIG. 13, the UE receives information including inter-frequency Device-to-Device (D2D) setting. The UE may receive the information via UE-specific signaling or broadcast signaling. In an example where the UE receives the information via broadcast signaling, the information may be included in a System Information Block (SIB) (S1310). Herein, for simplicity in the description, a system information block including the inter-frequency D2D setting will be referred to as a first system information block, and, among the system information blocks, (although inter-frequency D2D setting is not included) a system information block including an intra-frequency D2D setting will be referred to as a second system information block. Additionally, the first system information block may be differentiated from the second system information block, which include the intra-frequency D2D setting. More specifically, the first system information block may correspond to a new system information block, which is differentiated from the related art system information block (e.g. SIB 19). Furthermore, the first system information block may be assigned with a new system information block number (e.g., system information block 20 (SIB 20)).

The first system information block may be acquired at each acquisition period of the first system information block. Herein, the acquisition period of the first system information block may correspond to a scheduling period of the first system information block. Alternatively, the acquisition period of the first system information block may correspond to a period corresponding N times the scheduling period of the first system information block, and N may be an integer equal to or more than 2.

According to the present invention, the inter-frequency D2D setting may be provided to the UE by a cell. Additionally, by preventing the UEs that are not interested in the inter-frequency D2D discovery from performing the system information update procedure, the application of unnecessary (or invalid) D2D setting to the UE may be prevented.

The system information block will hereinafter be described in more detail.

According to the 3GPP Rel. 12, legacy system information update notification and acquisition may be applied for system information block 19, which includes the intra-frequency D2D setting. In case of following the related art, even in a case where an update of the inter-frequency D2D setting occurs, a paging message notifying the UEs of the update in the system information block 19 may be transmitted. Accordingly, a problem occurred in that (in addition to the UEs interested in the inter-frequency D2D) even the UEs that are not interested in the inter-frequency D2D (discovery) received the above-described paging message notifying the update in the system information block 19.

Accordingly, in order to resolve the above-described problem, the inter-frequency D2D setting provides a broadcasting method being performed through a separated system information block (e.g., system information block 20). More specifically, according to the present invention, the UE may receive the inter-frequency D2D setting through a separate system information block other than the system information block 19 (e.g., system information block 20). Additionally, along with the separated system information block 20 may be excluded from the system information update notification (performed via paging) and the system information modification notification (performed through a value tag).

In short, the new system information block (e.g., system information block 20 (SIB 20)) may be summarized as described below.

The D2D setting for other frequencies may be included in the system information 20.

The system information block 20 may be excluded from the system information update notification procedure. More specifically, the network does not indicate a system information update in an upcoming paging message corresponding to the system information block 20:

The system information block 20 may be excluded from a value tag update mechanism. More specifically, an update of the system information block 20 does not change (or modify) a value tag, which is included in the system information block 1.

In case the system information block 20, which is signaled from an independent system information block, is provided, the UE must only have a valid system information block 20. More specifically, the UE must not store or apply a system information block 20 that is expired (or outdated). In order to ensure above-described requirement, the options lusted below may be considered, and, for simplicity in the description, each option will be described with reference to the accompanying drawings.

Figure 14:
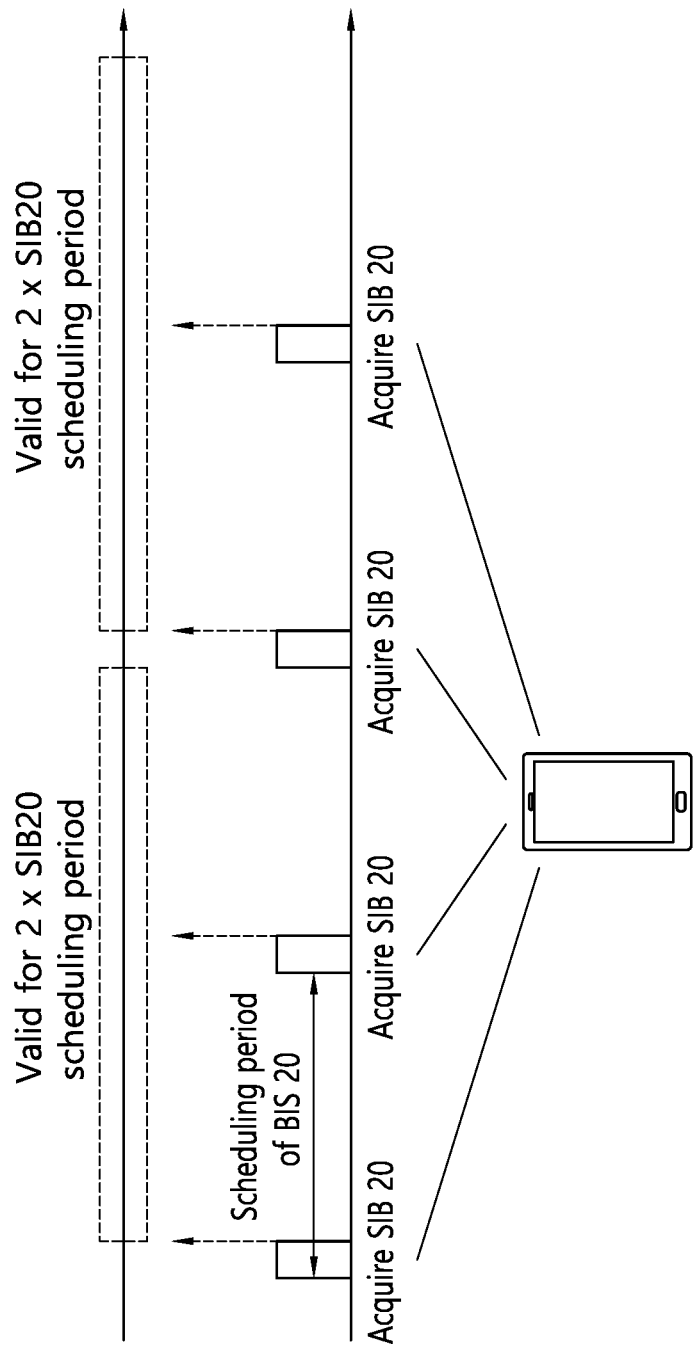
FIG. 14 illustrates a general example of a method for providing a valid system information block 20.

1) Option 1:

FIG. 14 illustrates a general example of a method for providing a valid system information block 20.

According to FGI. 14, the UE may periodically acquire a system information block 20 for the system information block 20. More specifically, the UE operates a system information block acquisition period. The period may correspond to a scheduling period of the system information block 20 or a system information modification period (BCCH modification period) corresponding to the system information block 20. After the UE acquires the system information block 20, the UE may determine that the system information block 20, which is acquired during a single scheduling period of the system information block 20 or for a minimal system information modification period, is valid.

2) Option 2:

According to the above-described Option 1, the UE must periodically acquire a system information block 20 for the system information block 20. This (i.e., Option 1) corresponds to a simple method, due to a frequency acquisition of the system information block 20, a larger amount of UE battery consumption may occur. In order to reduce such battery consumption, the UE may extend the period for acquiring the system information block 20. (For example, the acquisition period of the system information block 20 may be extended as much as N times its initial length.)

Figure 15:
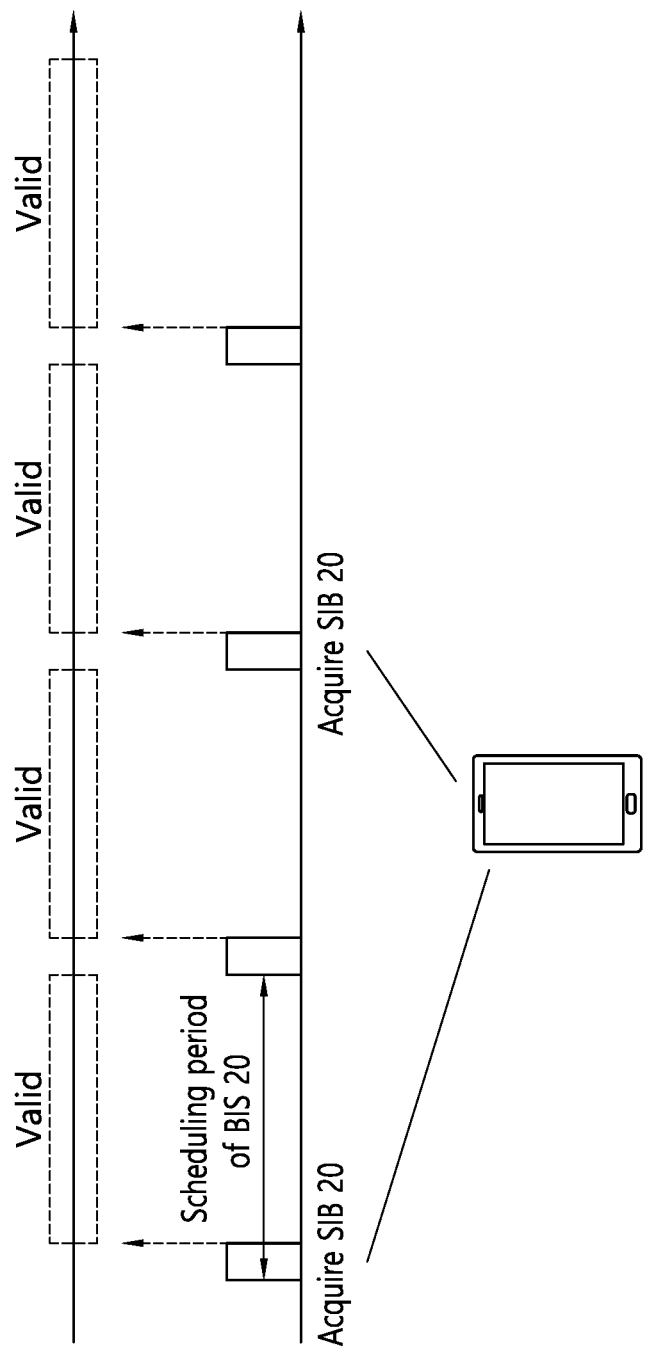
FIG. 15 illustrates another general example of a method for providing a valid system information block 20.

FIG. 15 illustrates another general example of a method for providing a valid system information block 20.

According to FIG. 15, in case the UE acquires the system information block 20, the UE may determine that the system information block 20, which is acquired during a duration (or time period) that is N times (herein, N may be an integer) longer than the period of the system information block 20, is valid. In other words, in case the system information block 20 is acquired, during a section that is N times longer than the acquisition period of the system information block 20, the UE may determine that the system information block 20 is valid. Accordingly, the UE may not be capable of acquiring the system information 20 at each scheduling period, and, therefore, the problem of having the UE excessively updating the system information block 20 may be resolved.

3) Option 3:

Instead of providing the method for acquiring a system information block 20 at each time section corresponding to N times the scheduling period of the system information block 20, a method of applying a minor modification on the existing (or legacy) system information notification may be provided. For example, a new flag for notifying the system information block 20 may be provided in the paging message. (More specifically, the paging message may include a flag that notifies an update in the system information block 20.) Generally, in case the inter-frequency D2D setting information, which is provided by a cell, is updated, the corresponding cell notifies within the paging message that the inter-frequency D2D setting information has been updated.

In summary, a new system information modification indicator may be provided in the paging message in order to notify the update in the system information block 20 (or only in the case for notifying the update in the system information block 20).

According to Option 3, the UE may avoid frequently acquiring the system information block 20. However, considering the increase in bits when adopting a new flag to the paging message, in light of the bit, this may not be a preferable method. Accordingly, even if the method according to Option 3 has some partial advantages in the aspect of battery consumption in the UE, the above-described Option 1 and Option 2 may correspond to more preferred options as compared to Option 3. Therefore, when choosing between Option 1 and Option 2, in light of the complexity issue, Option 2 may provide a better performance than Option 1.

The description on the options presented above may be summarized as described below.

The UE may acquire a system information block 20 at each 'acquisition period'. At this point, the acquisition period may be generated consecutively. The acquisition period may have a period corresponding to N times the scheduling period (i.e., N*scheduling period). As another method, the acquisition period may be defined as a boundary, just as the system information modification period (BCCH modification period (MP)). Accordingly, after the UE acquires the system information block 20, the UE may determine that the acquired system information block 20 is valid during the acquisition period.

Referring back to FIG. 13, the UE may perform inter-frequency D2D based on the inter-frequency D2D setting (S1320). The detailed operation of the UE performing inter-frequency D2D is as described above.

2. A method for providing information indicating a validity duration of the inter-frequency D2D setting Regarding the D2D operation in cells that are coordinated to cross the frequency, it cannot be assumed that the modification periods of the cells within different frequencies are identical to one another. Moreover, even in a case where the modification periods of the cells within different frequencies are all identical to one another, the modification boundaries of the different cells crossing the frequency may each be generated at a different timing. This will be described in more detail with reference to the accompanying drawings.

Figure 16:
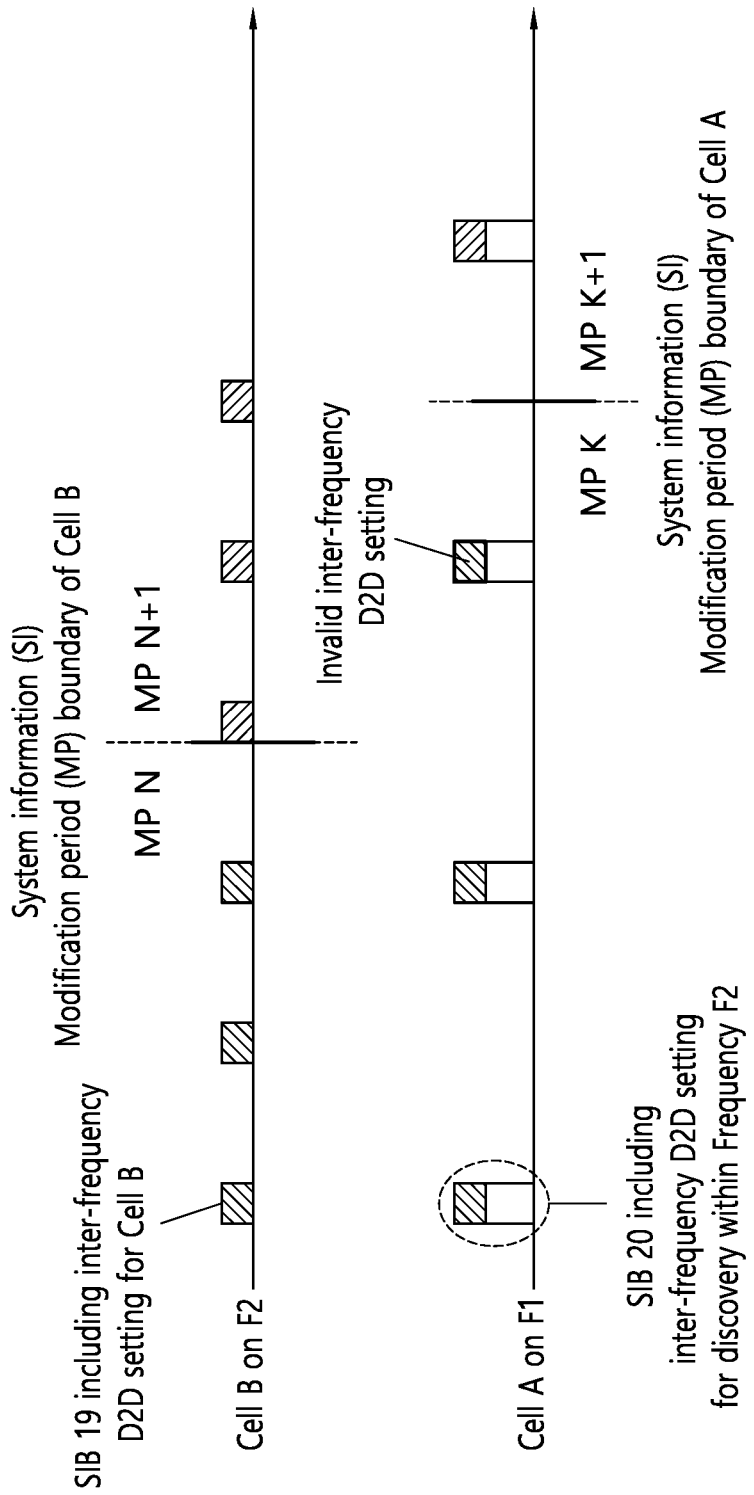
FIG. 16 illustrates a general example of setting up (or configuring) invalid inter-frequency D2D setting for the UE.

FIG. 16 illustrates a general example of setting up (or configuring) invalid inter-frequency D2D setting for the UE.

According to FIG. 16, Cell A (or Cell 1, for simplicity in the description both Cell A and Cell 1 may be used) may exist within Frequency 1 (F1 of the drawing), and Cell B (or Cell B, for simplicity in the description both Cell B and Cell 2 may be used) may exist within Frequency 2 (F2 of the drawing). At this point, a system information block 20, which includes inter-frequency D2D setting related to the discovery of Frequency 2, may be transmitted (or broadcasted) from Cell A. Additionally, a system information block 19, which includes intra-frequency D2D setting corresponding to Cell B, may be transmitted (or broadcasted) from Cell B.

In the above-described situation, an instant at which broadcasting of a new system information block 19 is initiated from Cell B may occur during a Modification Period (MP) of Cell A. In this case, the inter-frequency D2D setting for discovery within Frequency 2, which is signaled by Cell A, becomes invalid during the modification period of Cell A. In other words, in case Cell B broadcasts a new system information block 19, the inter-frequency D2D setting, which is signaled by Cell A, may correspond to an expired (or outdated) inter-frequency D2D setting. And, in the situation where the inter-frequency D2D setting is expired (or outdated), a new modification period is started (or initiated), and this new modification period may last until a new inter-frequency D2D setting for discovery within Frequency 2 is signaled from Cell A. In other words, the UE may receive (or may receive a broadcasting of) a system information block 20 including an invalid inter-frequency D2D setting, starting from a point (or section) where a new system information block 19 is transmitted from Cell B until a point (or section) where a new system information block 20 is transmitted from Cell A.

In order to prevent a mismatch in D2D setting crossing the coordinated cells (e.g., wherein Cell A may perform transmission and/or reception of general data and Cell B may perform D2D communication), the UE is required to be informed of a duration during which the signaled inter-frequency D2D setting is valid.

Hereinafter, a method for providing information indicating a validity duration of the inter-frequency D2D setting will be described in detail.

Figure 17:
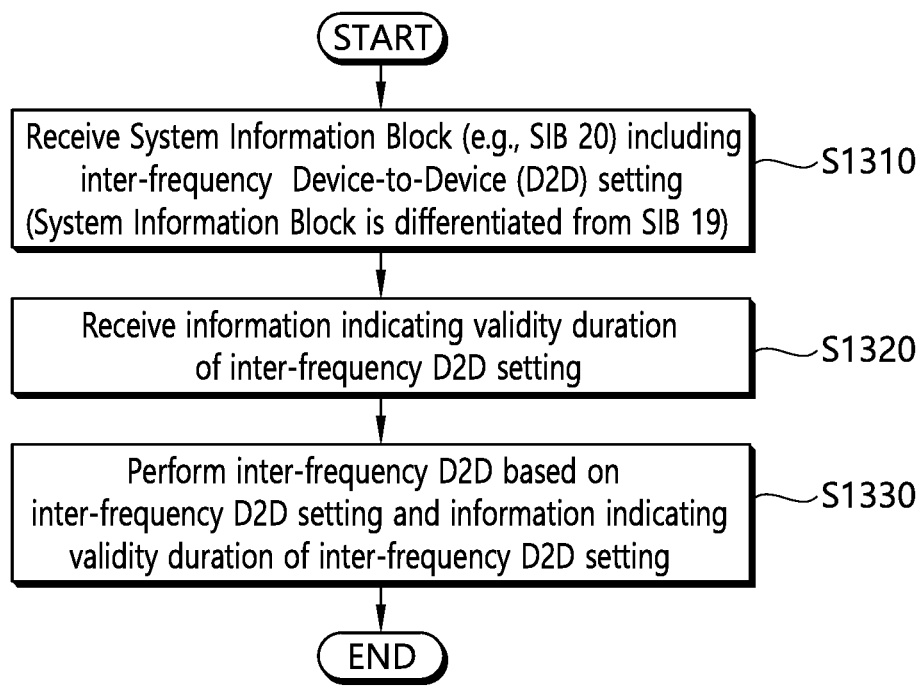
FIG. 17 is a flow chart of a method for providing information indicating a validity duration of the inter-frequency D2D setting according to an exemplary embodiment of the present invention.

FIG. 17 is a flow chart of a method for providing information indicating a validity duration of the inter-frequency D2D setting according to an exemplary embodiment of the present invention.

According to FIG. 17, the UE may receive information including the inter-frequency D2D setting frim a cell (S1710). Herein, for simplicity in the description, it will be assumed that the UE receives the inter-frequency D2D setting from system information of a serving cell, and a system information block including the inter-frequency D2D setting will be referred to as a first system information block, and, among the system information blocks, (although inter-frequency D2D setting is not included) a system information block including an intra-frequency D2D setting will be referred to as a second system information block. Additionally, the first system information block may be differentiated from the second system information block, which include the intra-frequency D2D setting. More specifically, the first system information block may correspond to a new system information block, which is differentiated from the related art system information block (e.g. SIB 19). Furthermore, the first system information block may be assigned with a new system information block number (e.g., system information block 20 (SIB 20)). A more detailed description of the first system information block has already been described above.

The UE may receive information indicating a validity duration of the inter-frequency D2D setting (S1720). Herein, the information indicating a validity duration of the inter-frequency D2D setting may refer to an indicator indicating a validity duration of the inter-frequency D2D setting, or this may also refer to inter-frequency D2D setting validity duration information. Alternatively, this may also refer to an inter-frequency D2D setting validity duration indicator indicating a validity duration of the inter-frequency D2D setting. More specifically, the above-described information may refer to information related to a validity duration of the inter-frequency D2D setting.

Herein, a first system information block including the inter-frequency D2D setting may be valid until a time point that is indicated by the information indicating the validity duration. Additionally, the first system information block may be received through a first cell within a first frequency, and the second system information block may be received through a second cell within a second frequency, and the inter-frequency D2D may be performed in the second cell within the second frequency. Additionally, the information indicating the validity duration may correspond to information indicating a time point at which the second system information block, which is received through the second cell, is updated. And, the time point at which the second system information block is updated may correspond to a boundary of a system information modification period of the second cell (Cell 2). Furthermore, the information indicating the validity duration may be received before the time point at which the second system information block is updated.

Hereinafter, the information indicating the above-described validity duration will be described in detail.

The UE may receive the information indicating the validity duration of the inter-frequency D2D setting from the network (or Cell A or Cell B of the above-described drawing).

If the UE is aware of a duration during which the inter-frequency D2D setting signaled to the UE is valid, the UE may use the inter-frequency D2D setting only during the duration in which the inter-frequency D2D setting is valid. For this, in case the serving cell may (additionally) transmit (or broadcast) a validity duration during which the inter-frequency D2D setting is considered (or viewed or determined or defined) to be valid. Along with the above-described valid information (i.e., the (valid) time during which the inter-frequency D2D setting is considered to be valid), whenever the UE newly acquires a system information block 20 from the serving cell, the UE may determine until when the inter-frequency D2D setting, which is acquired by the UE, is to be applied (or when to stop the application of the inter-frequency D2D setting, which is acquired by the UE).

The description presented above may be summarized as described below.

When the serving cell transmits the inter-frequency D2D setting to a UE via UE-specific signaling or broadcast signaling, the serving cell may transmit a duration (or information on a duration) during which the inter-frequency D2D setting may be considered to be valid.

The time (period) during which the inter-frequency D2D setting may be considered to be valid may be expressed as SFN # or Subframe # of a primary cell.

A validity duration (i.e., duration (or time period) during which the inter-frequency D2D information is valid) of the inter-frequency D2D information may be expressed as information indicating a final time point at which the system information block 20 is valid based on a specific standard time range. Alternatively, the validity duration of the inter-frequency D2D information may be expressed as information indicating a validity duration during which the UE may determine that the corresponding received information is valid starting from a time point at which the system information block 20 is received based on a specific standard time range. In this case, when the UE receives the validity duration information, the UE may also receive a standard time range, which is referred to as a reference for determining the validity duration, from the network along with the validity duration information. If the standard time range is not included, the UE assumed the standard time range that is currently managed by the UE as the standard time range for determining the validity duration of the D2D information.

The UE may receive position information or area information indicating a position or area where the inter-frequency D2D information is valid from the network. In case the UE receives the position information, the UE considers the D2D information as valid information only in a case where the UE is located within the valid area. In case the UE is not located within the valid area, the UE does not consider the D2D information as valid information. In case the UE has the valid position information and the validity duration information at the same time, even if the UE deviates from its valid position, the UE keeps the D2D information without deleting (or discarding) the corresponding information during the validity duration, and, then, the UE stores the corresponding information in order to prepare for its next entry to the valid area later on. The position information may be provided to the UE in diverse formats. For example, the position information may be configured as a set of GPS coordinates configuring the boundaries of an area. Alternatively, the position information of a cellular network may be configured of a set of Tracking Areas (TAs).

For simplicity, the description presented above will be described in more detail with reference to the accompanying drawing.

Figure 18:
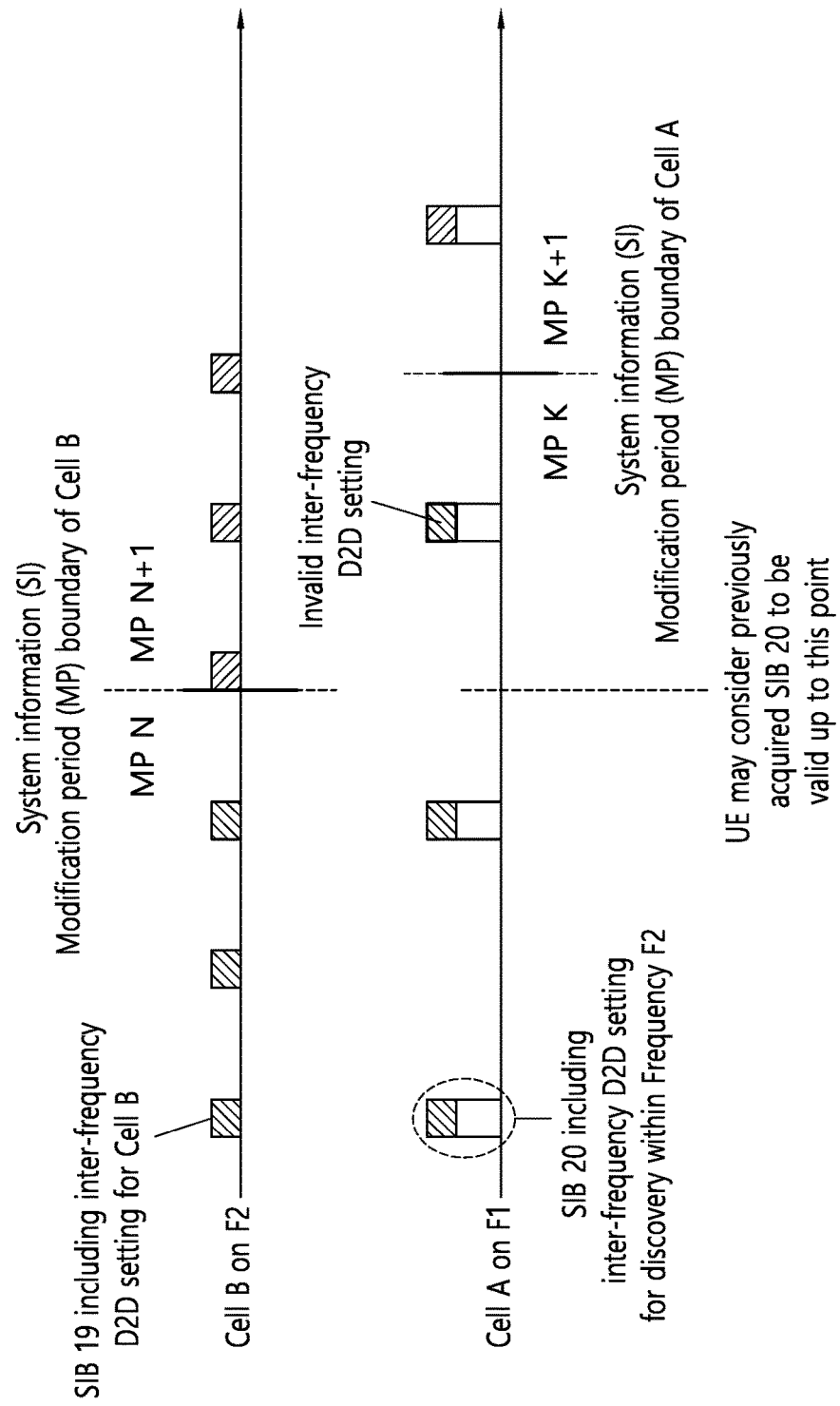
FIG. 18 illustrates a general example showing how the UE applies the valid information it has received.

FIG. 18 illustrates a general example showing how the UE applies the valid information it has received.

Referring to FIG. 18, as the UE is camping on Cell A, the UE may be interested in performing discovery within Frequency 2. Additionally, the UE may acquire system information block 20, which includes D2D setting that can be applied for Frequency 2 (Cell C), from Cell A.

Herein, a case where Cell B updates its own system information block 19 (e.g., tx resource) starting modification period N+1 may be considered. After Cell A and Cell B are coordinated, the update is required to be notified first to Cell A. In case Cell B first notifies the upcoming update to Cell A, Cell A may determine that all system information block 20 included in the acquisition period, which is included in the validity duration information (or which is indicated by the validity duration information), before modification period K+1 is valid. Accordingly, the UE(s) may determine a section during which the acquired system information block 20 is/are considered to be valid. Additionally, the UE may avoid application of invalid inter-frequency D2D setting. More specifically, after the modification period K+1, the UE may acquire system information block 20 including valid inter-frequency D2D setting for Frequency 2, and the UE may apply the setting for discovery within Frequency 2.

If the time indicating the validity is not included in the system information block 20 (or if the time indicating the validity fails to be received), the UE may determine that the system information block 2 is valid during the entire acquisition section (or period).

In summary, the UE may receive (or receive a broadcast of) information (or indicator) indicating the validity duration of the inter-frequency D2D setting from Cell B or Cell A. Herein, the information indicating the validity duration of the inter-frequency D2D setting may correspond to information (or time) indicating a boundary of the modification period (or a boundary at which the modification period is changed from modification period N to modification period N+1, or a boundary at which a new system information block 19 is acquired (i.e., a boundary at which the system information block 19 is updated)) of Cell B. Furthermore, the information indicating the validity duration of the inter-frequency D2D setting may be transmitted (or broadcasted) to Cell A and/or the UE before the boundary of the modification period of Cell B.

Thereafter, based on the information indicating the validity duration, the UE may determine the validity of the inter-frequency D2D setting during a section of the validity duration, which is indicated by the corresponding information. Furthermore, the UE may determine that the inter-frequency D2D setting is not valid after the section of the validity duration, which is indicated by the corresponding information. Accordingly, when performing the inter-frequency D2D, the UE may not use the invalid inter-frequency D2D setting.

In case the modification period of Cell A is changed, the UE may newly receive a new (or valid) inter-frequency D2D setting (through Cell A), and the UE may perform the inter-frequency D2D (through Cell B) based on the new inter-frequency D2D setting (which is received through Cell A) during the changed modification period.

For simplicity in the description, the description presented above has been mainly described in the viewpoint of the inter-frequency D2D. However, without loss of generality, the description presented above may also be applied to sidelink communication.

Referring back to FIG. 17, the UE may perform inter-frequency D2D based on the inter-frequency D2D setting and the information indicating the validity duration of the inter-frequency D2D setting (S1730). For example, the inter-frequency D2D may be performed until a time point being indicated by the information indicating the validity duration based on the inter-frequency D2D setting, and the inter-frequency D2D may not use the inter-frequency D2D setting after the time point being indicated by the information indicating the validity duration. Herein, the description of the UE performing inter-frequency D2D, based on the inter-frequency D2D setting, has already been presented above. Furthermore, a detailed example of the UE performing the inter-frequency D2D based on the information indicating the validity duration of the inter-frequency D2D setting has also been presented above.

Figure 19:
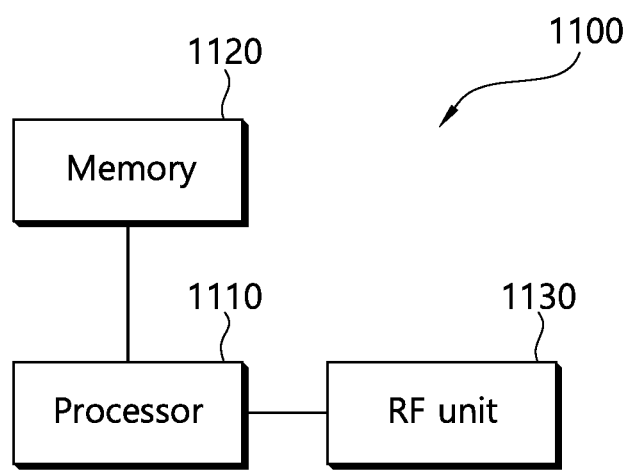
FIG. 19 is a block view showing a device implementing the exemplary embodiment of the present invention.

FIG. 19 is a block view showing a device implementing the exemplary embodiment of the present invention.

Referring to FIG. 19, the UE 1100 includes a processor 1110, a memory 1120, and a radio frequency (RF) unit 1130. The processor 1110 may receive a system information block (e.g., SIB 20), which includes inter-frequency Device-to-Device (D2D) setting. (Herein, the system information block is differentiated from SIB 19.) The processor 1110 may receive information indicating a validity duration of the inter-frequency D2D setting. The processor 1110 may perform inter-frequency D2D based on the inter-frequency D2D setting and the information indicating the validity duration of the inter-frequency D2D setting.

The RF unit 1130 is operatively connected to the processor 1110 and transmits and receives radio signals.

The processor may include an application-specific integrated circuit (ASIC), another chip set, a logical circuit, and/or a data processing device. The memory may include a read-only memory (ROM), a random access memory (RAM), a flash memory, a memory card, a storage medium, and/or another storage device. The RF unit may include a baseband circuit for processing radio signals. When the exemplary embodiment is implemented as software, the above-described method may be implemented as a module (process, function, and so on) performing the above-described functions. The module may be stored in the memory and may be executed by the processor. The memory may be located inside or outside of the processor and may be connected to the processor through a diversity of well-known means.

What is claimed is:

1. A method of performing an inter-frequency device-to-device (D2D) operation in a wireless communication system, the method performed by a user equipment (UE) and comprising:
   receiving a first system information block including inter-frequency D2D configuration;
   receiving information informing validity duration of the inter-frequency D2D configuration; and
   performing the inter-frequency D2D operation based on the inter-frequency D2D configuration and the validity duration,
   wherein the first system information block is differentiated from a second system information block including inter-frequency D2D configuration, wherein the first system information block is valid until a time point indicated by the information informing validity duration, wherein the first system information block is received through a first cell within a first frequency, wherein the second system information block is received through a second cell within a second frequency, wherein the inter-frequency D2D operation is performed in the second cell within the second frequency, and wherein the information informing the validity duration corresponds to information informing a time point at which the second system information block is updated, the second system information block being received through the second cell.

2. The method of claim 1, wherein the time point at which the second system information block is updated corresponds to a boundary of a system information modification period of the second cell.

3. The method of claim 1, wherein the inter-frequency D2D operation is performed based on the inter-frequency D2D configuration until a time point indicated by the information informing the validity duration, and wherein the inter-frequency D2D operation does not use the inter-frequency D2D configuration after a time point indicated by the information informing the validity duration.

4. The method of claim 1, wherein the information informing the validity duration is received before a time point at which the second system information block is updated.

5. The method of claim 1, wherein the first system information block corresponds to system information block 20 (SIB 20), and wherein the second system information block corresponds to system information block 19 (SIB 19).

6. The method of claim 1, wherein the first system information block is acquired at each acquisition period of the first system information block.

7. The method of claim 6, wherein the acquisition period of the first system information block corresponds to a scheduling period of the first system information block.

8. The method of claim 6, wherein the acquisition period of the first system information block corresponds to a period corresponding to N times of a scheduling period of the first system information block.

9. A user equipment, comprising:

a transceiver transmitting and receiving radio signals; and a processor being operatively connected to the transceiver, wherein the processor is configured to:

control the transceiver to receive a first system information block including inter-frequency device-to-device (D2D) configuration;

control the transceiver to receive information informing validity duration of the inter-frequency D2D configuration; and performing an inter-frequency D2D operation based on the inter-frequency D2D configuration and the validity duration, wherein the first system information block is differentiated from a second system information block including inter-frequency D2D configuration, wherein the first system information block is valid until a time point indicated by the information informing validity duration, wherein the first system information block is received through a first cell within a first frequency, wherein the second system information block is received through a second cell within a second frequency, wherein the inter-frequency D2D operation is performed in the second cell within the second frequency, and wherein the information informing the validity duration corresponds to information informing a time point at which the second system information block is updated, the second system information block being received through the second cell.

* * * * *